2,473,200

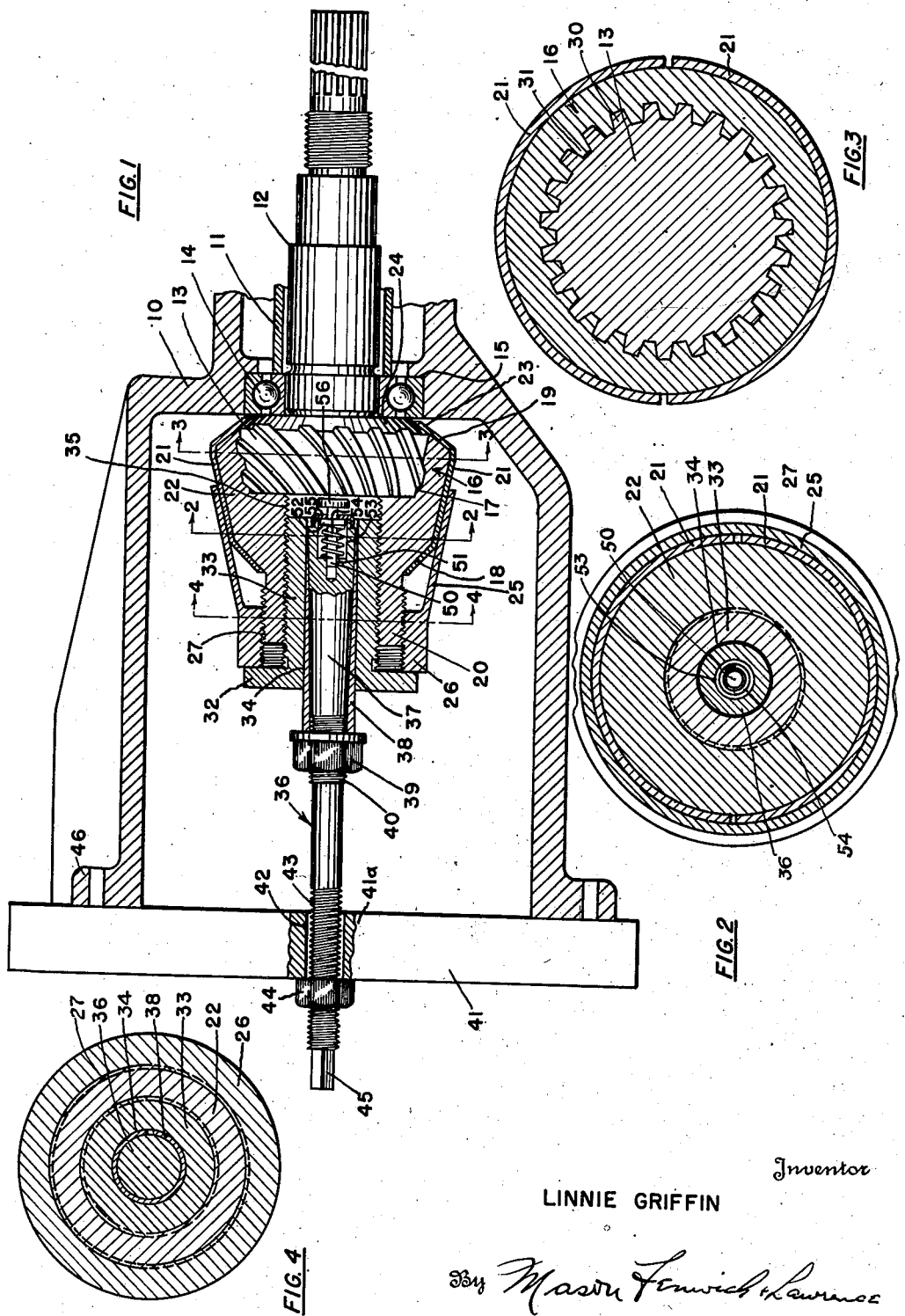
June 14, 1949.  L. GRIFFIN  2,473,200
SHAFT-PULLING TOOL
Filed Feb. 20, 1946
Inventor
LINNIE GRIFFIN
By Mason Fenwick & Lawrence
Attorneys Patented June 14, 1949

UNITED STATES PATENT OFFICE 2,473,200

SHAFT-PULLING TOOL

Linnie Griffin, Roanoke, Va., assignor of one-half to Earl A. Fitzpatrick, Roanoke, Va.

Application February 20, 1946, Serial No. 649,027

5 Claims. (Cl. 29—283)

This invention relates to a device for removing an axle and attached gear from the differential housing.

An object of the invention is the provision of a device for removing an axle and its attached gear from a bearing support, such as a differential housing in which a sleeve having internal threads is screwed on to the gear attached to the inner end of a rear axle, with a split shell embracing the sleeve, and provided with a flange engaging over an annular shoulder of the gear for aiding in retaining the threads of said pinion in locked condition with the internal threads in the sleeve, a draw bar received by the sleeve and removably attached thereto by a wedge, with means for limiting the inward movement of the draw bar in said sleeve.

Another object of the invention is the provision of a device for removing an axle and its attached gear from a differential housing in which a sleeve having internal threads is screwed on to the gear attached to the inner end of a rear axle, the engaged threads being held against release by a flange on a split shell embracing an annular shoulder on the gear, provision being made for holding the shell firmly on the sleeve, a draw bar having removable connections with the sleeve and received by a passage at the longitudinal center of the sleeve, the inner end of said draw bar having a spring-pressed stop for limiting the inward movement of said bar.

A further object of the invention is the provision of a device for removing an axle and its attached gear from a differential housing in which a threaded element is screwed on to the gear, said element having a central longitudinal passage receiving one end of a draw bar with a clamping bushing removably retaining the draw bar in place in the passage, the inner end of said passage terminating at the inner face of the gear, the inner end of said draw bar being limited in its inward movement in the passage by a spring-pressed stop.

The invention consists in the novel construction, arrangement and combination of parts hereinafter more particularly described and claimed.

In the drawings—

Figure 1 is a vertical longitudinal section of an axle removing device in position on a gear in a rear axle housing;

Figure 2 is a transverse vertical section taken along the line 2—2 of Figure 1;

Figure 3 is a transverse vertical section taken along the line 3—3 of Figure 1; and, Figure 4 is a transverse vertical section taken along the line 4—4 of Figure 1.

Referring more particularly to the drawings, 10 designates one half of a differential housing from which extends a rear axle housing 11 embracing a rear axle 12. A spiral gear 13 is attached to the inner end of the axle 12 and is located in the differential housing 10. A ball bearing 14 is mounted on the inner end of said axle within a seat 15 formed at the juncture of the differential housing 10 and the axle housing 11. The bearing is neatly fitted into said seat. This is conventional automobile construction.

The tool of the present invention comprises a sleeve 20 preferably formed of aluminum having a conical body 22 provided with an internally threaded socket 17 adapted to be screwed on to the gear 13. The main body 22 of the sleeve has oppositely disposed inclined shoulders 18 and 19. The portion of the sleeve 20 projecting beyond the inclined shoulder 18, is exteriorly threaded and the bore of this sleeve which extends into the socket 17 is interiorly threaded.

A frusto-conically shaped shell is formed of two identical sections 21 which embrace neatly the conical body 22 of the sleeve 20. The opposite ends of the shell are inturned at such an angle that said inturned ends will lie in flat contact with the associated inclined shoulders 18 and 19 of the body 22 of said sleeve. The ends 23 of the sections 21 engage over the conventional beveled shoulder 24 of the gear 13 for a purpose to be presently described.

A cup-shaped member 25 has an integrally formed nut 26 which is screwed on to external threads 27 on the extension 20 so that the member 25 will receive the sections 21 and bind said sections against the body 22 of the sleeve 16. The outer ends 23 of the sections 21 will extend over the beveled end of gear 13, and thus cooperate with engaged threads 30 and 31 on the respective gear 13 and the inner wall of the socket 17 for preventing either rotary or longitudinal disengagement of the gear from the body 22 of the sleeve.

A nut including a head 32 and an externally threaded collar 33 is screwed into the internally threaded extension 20 of the sleeve 16. sleeve and head have a longitudinal axial passage 34 which opens at its inner end into a space 35 partially defined by the end face of the gear 13 and the inner end of the collar 33. The head 32 engages the nut 26 and prevents displacement of said nut.

A draw bar generally designated by the numeral 36 has a frusto-conically shaped or tapered portion 37 located in the bore 34 in the collar 33. A cylindrically shaped split wedge or tapered bushing 38 surrounds the portion 37 and is disposed within the bore of the sleeve 33 so that when a nut 39 is turned on threads 40 formed on the draw bar 36, said nut will force the wedge bushing 38 inwardly of the bore 34 thus expanding the bushing and securing the draw bar 36 to the collar 33 in sleeve 16.

A bar 41 has an enlargement 41a provided with an opening 42 which receives a threaded portion 43 on the outer end of the draw bar 36. A nut 44 is screwed on to said threaded portion and engages the outer face of the bar 41. The outer extreme end 45 of the draw bar is hexagonal in shape so that it may be held by a suitable instrument against rotation when the nut 44 is turned.

The bar 41 contacts and bears against an annular flange 46 on the inner end of a half portion of the differential housing 10.

A stop is provided for limiting the inward movement of the portion 37 of the draw bar in the passage 34 and also for indicating the relative spacing of the inner end of the bar from the inner face of the gear 13. In other words, it is necessary to limit the position of the inner end of said bar because sufficient space must be allowed between said inner end and the gear to permit the draw bar to be driven inwardly when it is desired to release the wedge 38. For this purpose, a pin 50 is slidably mounted in an axial passage 51 in the inner end of the draw bar 36. A collar 52 disposed in a pocket 53 formed in the inner end of the bar and is secured to the pin. A coil spring 54 embraces said pin and has its opposite ends in respective engagement with the bottom of the pocket and the collar 52. A cap 55 screwed on the inner end of the draw bar retains the collar within the pocket. A head 56 on the outer end of the pin and located exteriorly of the pocket is adapted to contact the inner face of the gear 13 for indicating the inner limited position of the draw bar. The bar 36 may be slightly withdrawn after the head 56 contacts the gear in order to provide sufficient clearance between the gear and the inner end of said draw bar. The spring 54 will preferably be sufficiently strong to normally force back the bar 36 when the force used in the initial insertion of the bar is removed preliminary to expanding the bushing 38, so that the bar will be properly positioned when tightened in place to permit its release by being tapped inwardly toward the gear, thus loosening the cammed bushing 38.

The split bushing wedge 38 is preferably formed of brass, the sleeve 16 of aluminum, while all of the other elements are preferably made of steel.

In assembling the device preparatory to removing the axle 12, gear 13 and bearing 14, the threaded socket 17 of the sleeve 16 is screwed on to the gear 13. The sections 21 of the shell are fitted in place in embracing relation with the body 22 of the sleeve so that the inturned flanges on the opposite ends of the sections 21 will be in snug engagement with the inclined annular ends 18 and 19 of the body 22. In this condition, the outer edges 23 of the sections 21 will engage around the shoulder 24 of the gear 13.

The cup-shaped retaining member 25 will be screwed on the threaded extension 20 of the sleeve 16 until said member will bind the sections 21 on the body 22 of the sleeve. The collar 33 is then screwed into the extension 20 until the nut 32 binds the nut 26 against movement.

The tapered or frusto-conically shaped portion 37 of the bar 36 is then inserted into the passage 34 in the collar 33 until the head 56 engages the gear 13 and the spring 54 tends to resist further inward movement of said bar. The bar is slightly withdrawn by the spring 54 to provide the proper clearance between the gear and the inner end of the draw bar as previously explained. The split wedge 38 on the draw bar is moved into position over tapered part 37 and the nut 39 is turned to clamp the bar in position with the collar 33.

With all of the parts in operative positions, the nut 44 is rotated while the bar 36 is held against turning so that the bar will be drawn outwardly, pulling the sleeve 16, gear 13 and axle 12 away from its connections with the housing 10. Thus, it will be seen that the nut 44 performs a double function in that it not only holds the draw bar against movement when the wedge 38 is forced into place but it provides the means for pulling the gear 13 and axle 12 from the housing 10.

Although a preferred and practical embodiment of the invention has been shown and described herein, it is understood that various modifications may be made within the scope of the appended claims.

What I claim is:

1. A device for removing spiral gears from a bearing support comprising, a sleeve having a socket provided with spiral grooves adapted to receive the teeth of a spiral gear, a shell having complementary sections of such internal diameter as to fit around said sleeve, said shell sections each having inturned peripheral flanges engaging over the gear in said socket, and means for detachably securing the sections on the sleeve.

2. In a device for removing a gear from a bearing support, a sleeve, a body on the sleeve provided with a gear receiving socket, said sleeve having an axial bore leading into the socket, a draw bar having a tapered end received by the bore, a tapered bushing on the tapered end of the draw bar, means for forcing the bushing into the sleeve for removably connecting the bar to said sleeve, and means on the draw bar providing a predetermined clearance between the inner end of the bar and the adjacent face of a gear received by the socket including a spring pressed pin carried by the inner end of the bar having a head engageable with said face of the gear.

3. In a device for removing a gear from a bearing support, a sleeve, a body on the sleeve provided with a gear receiving socket, said sleeve having an axial bore leading into the socket, a draw bar having a tapered end received by the bore, means removably connecting the tapered end of the draw bar to the interior of the sleeve, and means for spacing the tapered end of the bar from the adjacent face of a gear received by the socket, said spacing means including a pin in the tapered end, a head on the pin and a spring forcing the pin outwardly of the tapered end for positioning the head adjacent the face of the gear.

4. In a device for removing a gear from a bearing support, a sleeve, a body on the sleeve provided with a gear receiving socket, said sleeve having an axial bore leading into the socket, a shell formed of two complementary sections embracing the body, each section having an inturned flange engaging over a shoulder on the gear for locking the gear in the socket, and a cup-shaped member neatly receiving the sections and threaded on the sleeve for securing the sections on the sleeve.

5. In a device for removing a gear and associated shaft from a bearing support, a sleeve formed with a conical body provided with a gear receiving socket, said sleeve having an interiorly threaded axial bore communicating with the socket, a shell formed of two complementary conical sections surrounding said conical body each section having an inturned flange adapted to engage a shoulder on and a gear within the socket for locking the gear therein, a cup-shaped member adapted to embrace the sections and threaded on the sleeve, and a second exteriorly threaded sleeve formed with a nut head adapted to engage the end of the cup-shaped member, said second sleeve of a length less than the bore in the first sleeve and adapted to be threaded therein.

LINNIE GRIFFIN.

REFERENCES CITED

The following references are of record in the file of this patent:

UNITED STATES PATENTS

| Number | Name | Date |
| --- | --- | --- |
| 165,546 | Cook | July 13, 1875 |
| 1,368,501 | Huddle | Feb. 15, 1921 |
| 1,420,532 | Edwards | June 20, 1922 |
| 1,436,806 | Jacob | Nov. 28, 1922 |
| 1,708,355 | Chipman | Apr. 9, 1929 |
| 1,858,238 | Cornwell | May 17, 1932 |
| 1,901,736 | Crumpacker | Mar. 14, 1933 |
| 2,318,980 | White | May 11, 1943 |